United States Patent [19]

Senanayake

[11] Patent Number: 5,168,922
[45] Date of Patent: Dec. 8, 1992

[54] BAROMETRIC DIRECT-CONTACT CONDENSER

[76] Inventor: Daya R. Senanayake, 9 Ecrin Place, Colombo 8, Sri Lanka

[21] Appl. No.: 460,887
[22] PCT Filed: Aug. 11, 1988
[86] PCT No.: PCT/LK88/00001
§ 371 Date: Apr. 11, 1990
§ 102(e) Date: Apr. 11, 1990
[87] PCT Pub. No.: WO89/01597
PCT Pub. Date: Feb. 23, 1989

[30] Foreign Application Priority Data

Aug. 12, 1987 [LK] Sri Lanka ................................ 9794

[51] Int. Cl.$^5$ ............................................... F28B 3/04
[52] U.S. Cl. .................................. 165/111; 165/104.31; 261/116; 261/DIG. 10; 261/DIG. 32
[58] Field of Search ................... 165/110, 111, 104.31; 60/688; 261/116, 115, DIG. 10, DIG. 32, DIG. 33

[56] References Cited

U.S. PATENT DOCUMENTS

| 493,123 | 3/1893 | Schutte | 261/DIG. 10 |
| 982,404 | 1/1911 | Wiki | 261/DIG. 10 |
| 4,449,368 | 5/1984 | Haynie | 60/692 |
| 4,506,508 | 3/1985 | Coers et al. | 165/110 |

FOREIGN PATENT DOCUMENTS 46262 2/1889 Fed. Rep. of Germany ... 261/DIG. 32

Primary Examiner—Albert W. Davis, Jr.
Attorney, Agent, or Firm—Horst M. Kasper

[57] ABSTRACT

A barometric direct-contact steam condenser (10) in which a stream of vapor and formed condensate contacts a free surface of the condensate, which surface is preferentially removed, preferably continuously, so as to provide a cooler surface against which and/or as a result of which more vapor can condense.

14 Claims, 1 Drawing Sheet

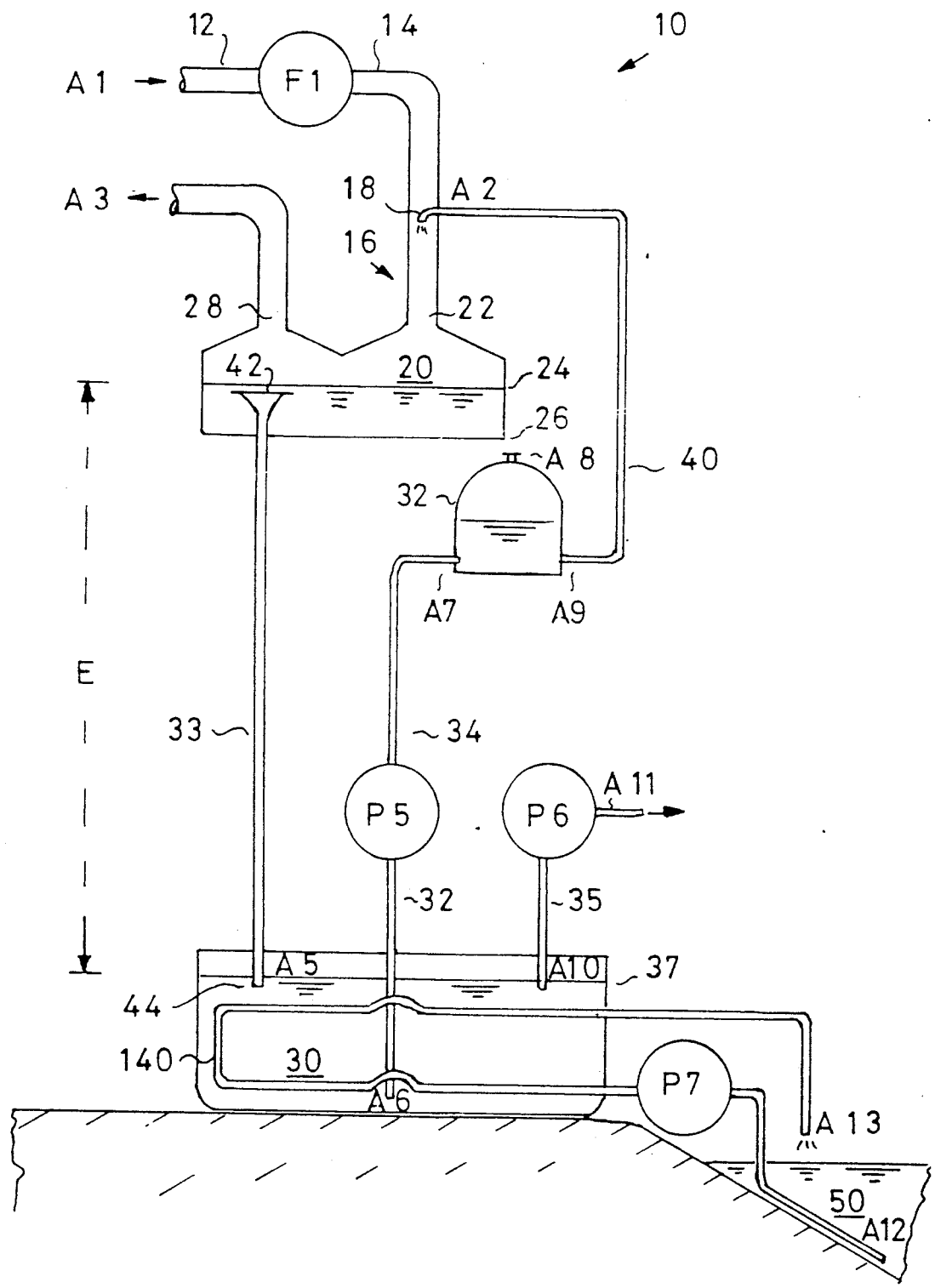

BAROMETRIC DIRECT-CONTACT CONDENSER

TECHNICAL FIELD

This invention relates to a barometric direct-contact condenser.

BACKGROUND OF THE INVENTION

In this specification geometrical terms such as "above" and "below" relate to the gravitational directions, "above" being further from the centre of the earth than "below".

Materials can be found in the solid, liquid and gaseous phases; at lower ambient temperatures and higher pressures the material tends towards the solid phase, and at higher temperatures and lower pressures the material tends towards the gaseous phase.

A condenser is employed to convert a gas (a material in its gaseous phase) into its liquid phase. As the gas is condensed, it gives off its latent heat of evaporation, warming the surrounding area, and also reducing in volume. Condensers are typically employed in power plants for the condensation of exhaust steam from turbines, and in refrigeration plants for the condensation of refrigerant vapours such as the Freons or ammonia. They are also employed in the petroleum and chemical industries for the condensation of hydrocarbons and other chemical vapours.

DESCRIPTION OF THE PRIOR ART

In the important product area of steam condensers, it is known to provide a low pressure region into which the steam can exhaust, the condenser also having a condensate chamber for collecting the condensed steam (condensate) so that it can be reused, or removed for other applications. As disclosed in the 1964 edition of the Encyclopaedia Britannica, Volume 6 at pages 273/274, two main types of steam condenser are known: {a} surface condensers, in which the condensing steam does not come into direct contact with cooling medium e.g. water, but is separated from it by the walls of a tube through which the cooling water flows; {b} direct-contact condensers in which cooling water is sprayed into the steam and intermingles with it, helping condensation. In the barometric type of direct-contact steam condenser, the steam is directed into a condenser chamber (immediately upstream of a condensate chamber) into which large quantities of water are sprayed; the water coming into contact with the steam helps it to condense, whilst the consequent reduction of steam volume also helps to create a lower (vacuum) pressure, whilst furthermore in order to help maintain this vacuum the water to be discharged from the condensate chamber is directed into a long vertical pipe (a tailpipe) which extends downwards about 10 metres into a lake, stream or other body of water.

One disadvantage of the known types of barometric direct-contact steam condensers is that since the condensation of the steam is accompanied by the giving up of the latent heat of vapourisation, the condenser chamber and/or condensate chamber warms up, so that the rate and efficiency of condensation can reduce over a period of time. Another disadvantage is that the condensed steam becomes contaminated by the cooling water and thus cannot be reclaimed for further use without chemical treatment.

SUMMARY OF THE INVENTION

I propose to avoid or reduce one disadvantage of the known barometric direct-contact steam condenser by providing a renewed, preferably continuously renewed, free liquid condensate surface. I propose to avoid or reduce the other stated disadvantage by re-using water discharged from the condensate chamber as cooling water.

According to one feature of my invention I provide a barometric direct-contact condensate comprising a condenser chamber, spray means in the condenser chamber, a condensate chamber, a base for the condensate chamber, the condensate chamber being adapted to retain condensate up to a condensate surface level above the base, a reservoir for liquid, the condensate chamber being adapted for positioning at a level above that of the surface of liquid in the reservoir, a tailpipe having an inlet and an outlet and extending from the condensate chamber to below the surface of liquid in the reservoir, an inlet into the condensate chamber connected to the condenser chamber wherein the tailpipe has its inlet above the base of the condenser chamber but below the condensate surface level and wherein the reservoir is cooled by liquid circulated in pipes within the reservoir. Preferably the liquid reservoir is a closed tank receiving condensate by way of the tailpipe and is therefore a condensate reservoir, the tailpipe terminating just below the surface of the reservoir liquid so that the tailpipe acts as a pressure seal for the condensing steam in the condenser chamber; usefully the spray means is connected to the condensate reservoir, to draw condensate from the coolest region thereof for forced spraying into the condenser chamber.

It is a useful feature of my invention that I can provide a method of producing condensate from a vapour comprising feeding the vapour towards a condenser chamber, wetting and cooling the vapour by injecting a cooler liquid, retaining formed condensate in a condensate chamber with the free liquid surface thereof substantially at a pre-determined level, and removing a fraction of the formed condensate in its liquid phase from said chamber characterised in that the condensate is removed from adjacent its free liquid surface whereby the said surface is renewed with cooler retained condensate. Preferably the removed collected condensate is collected in a condensate reservoir; usefully the vapour/spray mix is directed through the inlet of the condensate chamber to impinge against the condensate surface, which is cool and so causes more vapour to condense, the condensate surface thereby becoming warmed as it accepts the latent heat of vapourisation, this condensate surface being thereafter removed and renewed with cooler condensate. Preferably the condensate surface is continuously removed, and automatically replaced with cooler condensate.

DESCRIPTION OF THE PREFERRED EMBODIMENTS

The invention will be further described by way of example with reference to the accompanying schematic FIGURE (not to scale).

Pure water vapour, produced for example from sea water in a vacuum evaporation chamber (not shown) at a relatively high temperature is drawn into the condenser 10 from conduit 12 in the direction of arrow A1 by a fan F1, which then drives the vapour along conduit 14 towards the condenser chamber 16. In this embodiment condenser chamber 16 is a continuation of conduit 14, but in an alternative embodiment is an enlargement thereof.

Within condenser chamber 14 there is a water injection nozzle 18. Downstream of condenser chamber 16 is condensate chamber 20, which has an inlet 22 in communication with the condenser chamber 16. In alternative embodiments, condensation may still continue to occur, or may primarily occur, in the condensate chamber 20, depending upon the selected chamber designs. The primary purpose however of the condensate chamber is to retain condensate up to level 24, which is above the level of the base 26 of the condensate chamber 20.

Condenser 10 is generally at high vacuum, and this vacuum is enhanced by the condensation and consequent reduction in volume of the steam from conduit 12. Vapour which does not condense is removed through outlet 28 of the condensate chamber in the direction of arrow A3, and is returned to the vacuum evaporation chamber.

It is a feature of this invention that the condensate in condensate chamber 20 is maintained substantially at a constant predetermined level 24 Water injected through nozzle 18, together with the condensate formed from the vapour from conduit 12 will tend to raise this water level, but such water flows through the tail pipe 33 into the cold water or condensate reservoir 30. Reservoir 30 is maintained cold as by the circulation of sea water drawn in through inlet A12 by pump P7, before being returned to the sea at exit A13. The level of water in reservoir 30 is maintained substantially constant, the excess water being withdrawn by way of pump P6 from a conduit 35 having an inlet A10 just below the cold condensate surface 37 and so able to remove the warmer fractions of water; these warmer fractions of reservoir 30 water are withdrawn by pump P6 to feed e.g. a fresh water drink supply by way of conduit A11.

Nozzle 18 is supplied with cold water from the cold water reservoir 30 by way of pump P5, the cold water reaching nozzle 18 after having first been fed through de-aerator 32, which has an inlet A7 connected to conduit 34, a water outlet A9 connected to conduit 40 and an air outlet A8. Pump P5 draws cold water by way of conduit 32 having an inlet A6 well below the surface of the water in cold water reservoir 30, so that it draws from the colder fractions.

Between condensate chamber 20 and cold water reservoir 30 is a tailpipe 33. It is a particular feature of the invention that the tail pipe 33 has its inlet 42 just below the normal level 24 of the condensate in condensate chamber 20. It is a further feature of the invention that the tail pipe 33 has its outlet 44 just below the surface level of the condensate in cold water reservoir 30 i.e. so the relatively warm water withdrawn from the surface of the condensate in condensate chamber 20 is discharged from the tailpipe near the surface of the condensate in the cold water reservoir 30.

In use, some of the steam from conduit 12 condenses in the condensing chamber 16, having been force-cooled by the injection of a considerable volume of liquid condensate from injection nozzle 18, but nevertheless giving up considerable energy as heat from its latent heat of evaporation, and the resulting liquid mix of condensate and injected water will run down into the condensate chamber 20. Some of the remaining (i.e. non-condensed) steam entering condensate chamber 20 through inlet 22 will impinge or otherwise contact the surface of the condensate in condensate chamber 20, and will thus tend to give up both its thermal energy and its latent heat of vapourisation at that surface. This surface water is continuously removed because of the special positioning of the tail pipe inlet 42 just below this surface 24. This warmer surface water is thus continuously renewed with colder "below-surface" water, allowing a higher conversion of steam to condensate. It will be understood that the warmer layers of water at the condensate surface 24 are removed substantially as they form, thereby providing a fresh colder water surface against which more of the incoming vapour may condense. An advantage of this arrangement is that the condensation can take place at the same level of vacuum as that prevailing in the evaporation chamber upstream of pump F1 (but at a cooler condensation chamber temperature).

In this embodiment, pump P6 withdraws condensate from the warmer fractions at the surface of the liquid in the closed cooling water reservoir 30, and this removal of water is regulated and used to control and maintain the level of the free liquid surface 24 under vacuum in the condensing chamber 20 i.e. to maintain a pressure above the liquid surface sufficient to support the column of water in tailpipe 33. In an alternative embodiment, reservoir chamber 30 is open to atmosphere above the liquid level.

Nozzle 18 is fed with the cooler fractions of water from near the bottom of the cooling water reservoir 30. The effectiveness of the cooling water reservoir 30 is enhanced by drawing in water from a suitable depth in the sea or deep lake (50), where temperatures are naturally low, and circulating this cooling sea water through a network of pipes 140 immersed in the cooling water reservoir; and by removing the warmer fractions of water from the cooling water reservoir (for other uses) with the aid of pump P6.

The plant can be manufactured in modular form, so that a different number of the various component units can be connected together i.e. one or more condensing chambers can be connected with one or more cooling water reservoirs.

The source of vapour upstream of pump F1, and produced under vacuum or otherwise as appropriate, can be part of a plant used to desalinate sea water, purify water generally, or to distil liquids which need to be vapourised in a vacuum at low temperature.

I claim:

1. A barometric direct-contact condenser comprising
   a condenser chamber (16),
   spray means (18) in the condenser chamber,
   a condensate chamber (20),
   a base (26) for the condensate chamber, the condensate chamber being adapted to retain condensate up to a condensate surface level (24) above the base,
   a reservoir (30) for liquid, the condensate chamber being adapted for positioning at a level above that of the surface of liquid in the reservoir,
   a tailpipe (33) having an inlet (42) and an outlet (44) and extending from the condensate chamber to below the surface (37) of liquid in the reservoir,
   an inlet (22) into the condensate chamber connected to the condenser chamber,
   a conduit (32, 34, 40) for the spray means (18),
   wherein the tailpipe has its inlet (42) above the base of the condensate chamber but below the condensate surface level (24), and wherein a de-aerator is positioned in the conduit (32, 34, 40) connecting the reservoir (30) to the spray means (18).

2. The barometric direct-contact condenser according to claim 5, wherein the condensate chamber has an outlet (28) connected to the source of vapour.

3. A barometric direct-contact condenser according to claim 1 in which the liquid reservoir is a closed tank, receiving condensate from the condensate chamber by way of the tailpipe (33) having an outlet (44), and from which condensate can be withdrawn to maintain the surface level (37) of the reservoir substantially constant.

4. A barometric direct-contact condenser according to claim 1 in which the tailpipe outlet (44) is positioned just below the surface (37) of liquid in the reservoir to act as a pressure seal for steam condensing in the condenser chamber, and an outlet (A10) also just below the said surface (37) for condensate to be withdrawn for external uses.

5. A barometric direct-contact condenser according to claim 1 in which the spray means (18) is connected to the reservoir by a conduit (32, 34, 40), having an inlet (A6) well below the surface (37) of liquid in the reservoir, to draw cooling water from the coolant region of the reservoir.

6. A barometric direct-contact condenser comprising
   a condenser chamber (16),
   spray means (18) in the condenser chamber,
   a condensate chamber (20),
   a base (26) for the condensate chamber, the condensate chamber being adapted to retain condensate up to a condensate surface level (24) above the base,
   a reservoir (30) for liquid, the condensate chamber being adapted for positioning at a level above that of the surface of liquid in the reservoir,
   a tailpipe (33) having an inlet (42) and an outlet (44) and extending from the condensate chamber to below the surface (37) of liquid in the reservoir,
   an inlet (22) into the condensate chamber connected to the condenser chamber,
   wherein the tailpipe has its inlet (42) above the base of the condensate chamber but below the condensate surface level (24), and wherein the reservoir is cooled by water circulated in pipes (140) within the reservoir.

7. A barometric direct-contact condenser according to claim 6 in which the liquid reservoir is a closed tank, receiving condensate from the condensate chamber by way of the tailpipe (33) having an outlet (44), and from which condensate can be withdrawn to maintain the surface level (37) of the reservoir substantially constant.

8. A barometric direct-contact condenser according to claim 6 in which the tailpipe outlet (44) is positioned just below the surface (37) of liquid in the reservoir to act as a pressure seal for steam condensing in the condenser chamber, and an outlet (A10) also just below the said surface (37) for condensate to be withdrawn for external uses.

9. A barometric direct-contact condenser according to claim 6 in which the spray means (18) is connected to the reservoir by a conduit (32, 34, 40), having an inlet (A6) well below the surface (37) of liquid in the reservoir, to draw cooling water from the coolest region of the reservoir.

10. A barometric direct-contact condenser according to claim 6 in which the condensate chamber has an outlet (28) connected to the source of vapour.

11. A barometric direct-contact condenser comprising
    a condenser chamber (16);
    spray means (18) in the condenser chamber;
    a condensate chamber (20);
    a base (26) for the condensate chamber, wherein the condensate chamber is adapted to retain condensate up to a condensate surface level (24) above the base;
    a reservoir (30) for liquid, wherein the condensate chamber is adapted for positioning at a level above that of the surface of liquid in the reservoir,
    a tailpipe (33) having an inlet (42) and an outlet (44) and extending from the condensate chamber to below the surface (37) of liquid in the reservoir;
    an inlet (22) into the condensate chamber connected to the condenser chamber, wherein the tailpipe has its inlet (42) above the base of the condensate chamber but below the condensate surface level (24), wherein the liquid reservoir is a closed tank, receiving condensate from the condensate chamber by way of the tailpipe (33) having an outlet (44), and from which condensate can be withdrawn to maintain the surface level (37) of liquid in the reservoir substantially constant, wherein the tailpipe outlet (44) is positioned just below the surface (37) of liquid in the reservoir to act as a pressure seal for steam condensing in the condenser chamber, and wherein an outlet (A10) is provided just below the said surface (37), and through which condensate can be withdrawn for external uses, wherein the spray means (18) is connected to the reservoir by a conduit (32, 34, 40), having an inlet (A6) well below the surface (37) of liquid in the reservoir, and wherein the condensate water is cooled by water circulated in pipes (140) within the reservoir; wherein the inlet (A6) is located so as to draw cooling water from the coolest region of the reservoir; wherein the condensate chamber has an outlet (28) connected to the source of vapour.

12. The barometric direct-contact condenser comprising
    a condenser chamber (16);
    spray means (18) in the condenser chamber;
    a condensate chamber (20);
    a base (26) for the condensate chamber, wherein the condensate chamber is adapted to retain condensate up to a condensate surface level (24) above the base;
    a reservoir (30) for liquid, wherein the condensate chamber is adapted for positioning at a level above that of the surface of liquid in the reservoir;
    a tailpipe (33) having an inlet (42) and an outlet (44) and extending from the condensate chamber to below the surface (37) of liquid in the reservoir;
    an inlet (22) into the condensate chamber connected to the condenser chamber, wherein the tailpipe has its inlet (42) above the base of the condensate chamber but below the condensate surface level (24), wherein the liquid reservoir is a closed tank, receiving condensate from the condensate chamber by way of the tailpipe (33) having an outlet (44), and from which condensate can be withdrawn to maintain the surface level (37) of liquid in the reservoir substantially constant, wherein the tailpipe outlet (44) is positioned just below the surface (37) of liquid in the reservoir to act as a pressure seal for steam condensing in the condenser chamber, and wherein an outlet (A10) is provided just below the said surface (37), and through which condensate can be withdrawn for external uses, wherein the spray means (18) is connected to the reservoir by a conduit (32, 34, 40), having an inlet (A6) well below the surface (37) of liquid in the reservoir, and wherein the condensate water is cooled by water circulated in pipes (140) within the reservoir; a de-aerator positioned in the conduit (32, 34, 40) and connecting the reservoir (30) to the spray means (18).

13. A barometric direct-contact condenser comprising
   a condenser chamber (16),
   spray means (18) in the condenser chamber,
   a condensate chamber (20),
   a base (26) for the condensate chamber, the condensate chamber being adapted to retain condensate up to a condensate surface level (24) above the base,
   a reservoir (30) for liquid, the condensate chamber being adapted for positioning at a level above that of the surface of liquid in the reservoir,
   a tailpipe (33) having an inlet (42) and an outlet (44) and extending from the condensate chamber to below the surface (37) of liquid in the reservoir,
   an inlet (22) into the condensate chamber connected to the condenser chamber,
   wherein the tailpipe has its inlet (42) above the base of the condensate chamber but below the condensate surface level (24), and wherein the reservoir is cooled by a liquid circulated in pipes (140) within the reservoir.

14. The barometric direct-contact condenser according to claim 13 wherein the liquid provided by the reservoir is distilled water.

* * * * *